(12) United States Patent
Taguchi et al.

(10) Patent No.: US 11,867,543 B2
(45) Date of Patent: Jan. 9, 2024

(54) FIELD DEVICE CASE AND FIELD DEVICE

(71) Applicant: Yokogawa Electric Corporation, Tokyo (JP)

(72) Inventors: Masaya Taguchi, Musashino (JP); Akira Uehara, Musashino (JP); Kentaro Yamada, Musashino (JP); Yudai Hirai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 100 days.

(21) Appl. No.: 17/506,205

(22) Filed: Oct. 20, 2021

(65) Prior Publication Data

US 2022/0136874 A1    May 5, 2022

(30) Foreign Application Priority Data

Oct. 30, 2020 (JP) ................ 2020-182309

(51) Int. Cl.
*G01F 1/32* (2022.01)
*G01F 15/14* (2006.01)
*G01F 1/325* (2022.01)

(52) U.S. Cl.
CPC .............. *G01F 1/32* (2013.01); *G01F 1/3209* (2013.01); *G01F 1/3287* (2022.01); *G01F 15/14* (2013.01)

(58) Field of Classification Search
CPC ........ G01F 1/32; G01F 1/3209; G01F 1/3287; G01F 15/14; G01F 15/18
See application file for complete search history.

(56) References Cited

U.S. PATENT DOCUMENTS

| | | | | |
|---|---|---|---|---|
| 5,463,904 | A | * 11/1995 | Kalinoski | ............ G01F 1/3218 73/861.24 |
| 2020/0003647 | A1 | * 1/2020 | Sugahara | ............ G01L 19/0084 |
| 2020/0185812 | A1 | 6/2020 | Schäuble et al. | |

FOREIGN PATENT DOCUMENTS

| | | |
|---|---|---|
| EP | 2228879 A1 | 9/2010 |
| JP | 2002-107192 A | 4/2002 |
| WO | 2018/210490 A1 | 11/2018 |

* cited by examiner

*Primary Examiner* — Erika J. Villaluna
(74) *Attorney, Agent, or Firm* — RANKIN, HILL & CLARK LLP

(57) ABSTRACT

A field device case is a metal field device case where a lead-in part for drawing a cable including an outer shield is provided on a tubular circumferential wall. The field device case includes: a first inner surface which is formed away from an opening end surface of the field device case in an axial direction orthogonal to the opening end surface; a second inner surface which is formed farther away from the opening end surface than the first inner surface in the axial direction; and a cable fixing member which is fixed to the first inner surface and allows the outer shield of the cable drawn by the lead-in part to be in contact with the second inner surface.

19 Claims, 6 Drawing Sheets

FIELD DEVICE CASE AND FIELD DEVICE

BACKGROUND

Field of the Invention

The present invention relates to a field device case and a field device. Priority is claimed on Japanese Patent Application No. 2020-182309, filed on Oct. 30, 2020, the contents of which are incorporated herein by reference.

Description of Related Art

As one item of field devices, a vortex flowmeter disclosed in Japanese Unexamined Patent Application Publication No. 2002-107192 is known. The vortex flowmeter includes a vessel having a cylindrical side wall and a bulkhead provided in the central part of the side wall. The inside of the vessel is divided into a terminal box chamber and an amplifier chamber by the side wall and the bulkhead. The terminal box chamber is provided with a terminal box part having a signal terminal part and a power source terminal part. The amplifier chamber is provided with an amplifier part that processes an input signal and a power source input.

However, an opening end surface of the aforementioned vessel is covered by a lid. The vessel and the lid are spigot fitted, and a lead-in port for drawing a cable into the terminal box chamber is disposed at a deep position away from the opening end surface so as not to overlap a fitting part of the lid. In the related art, as a measure against noise in a cable, a braided shield serving as an outer shield is loosened, shield wires thereof are bundled, and a connection terminal is attached to the shield wires and is connected to a ground portion of a terminal box part disposed near an opening end. However, this connection method has a problem that terminal processing is complicated, so that many work man-hours are required and mistakes are likely to occur.

SUMMARY

A field device case is a metal field device case where a lead-in part for drawing a cable including an outer shield is provided on a tubular circumferential wall. The field device case may include: a first inner surface which is formed away from an opening end surface of the field device case in an axial direction orthogonal to the opening end surface; a second inner surface which is formed farther away from the opening end surface than the first inner surface in the axial direction; and a cable fixing member which is fixed to the first inner surface and allows the outer shield of the cable drawn by the lead-in part to be in contact with the second inner surface.

Further features and aspects of the present disclosure will become apparent from the following detailed description of exemplary embodiments with reference to the attached drawings.

DESCRIPTION OF EMBODIMENTS

Figure 1:
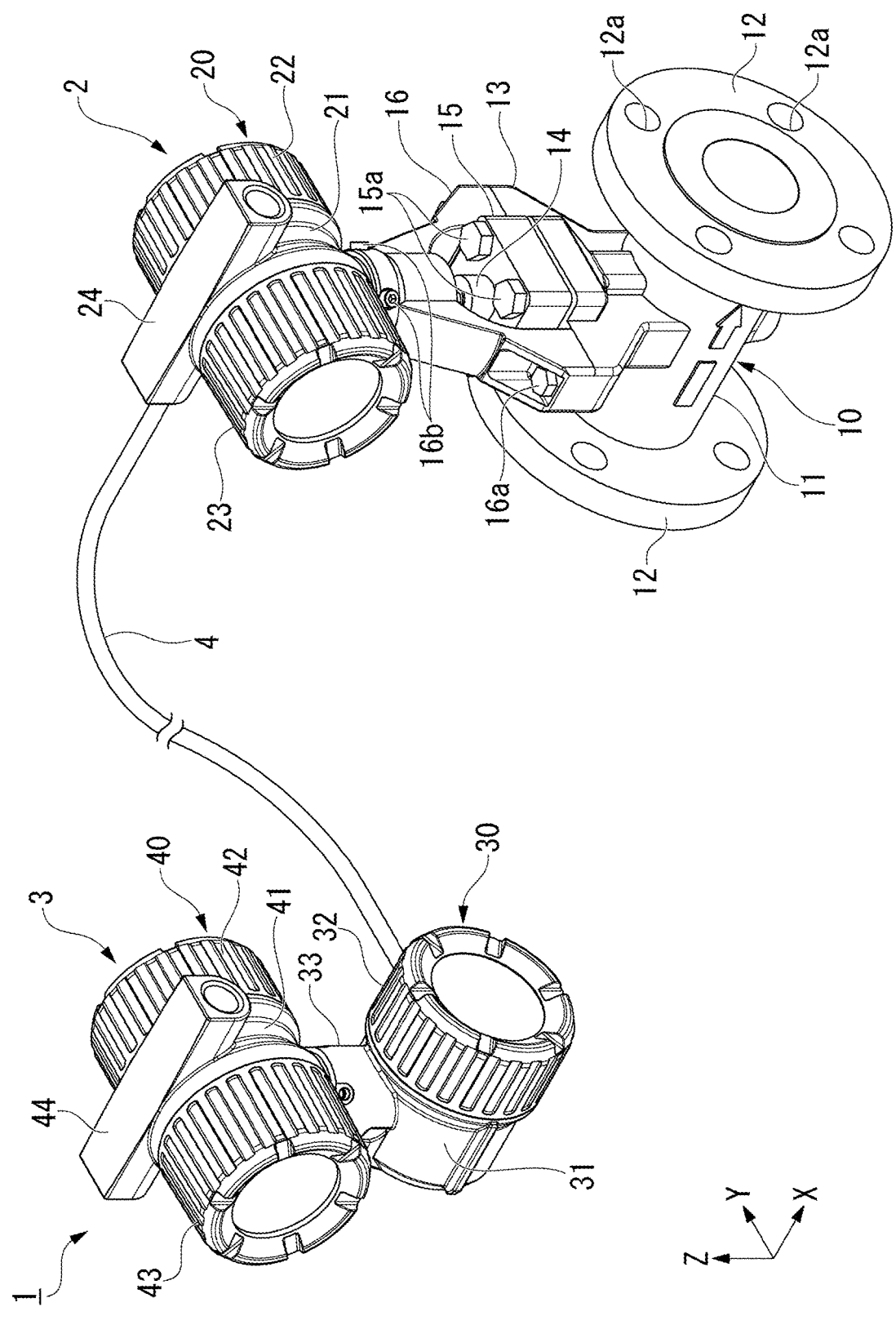
FIG. 1 is a perspective view showing a field device according to an embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to easily take measures against noise in a cable without complicated terminal processing in a field device case and a field device where the cable is drawn from a circumferential wall portion away from an opening end surface.

Hereinafter, a field device case and a field device according to an embodiment of the present invention will be described in detail with reference to the drawings. Hereinafter, an overview of an embodiment of the present invention will be described first, and then details of an embodiment of the present invention will be described.

[Overview]

The aforementioned vortex flowmeter disclosed in Japanese Unexamined Patent Application Publication No. 2002-107192 is a measuring instrument that measures a flow speed or a flow rate by measuring the frequency of the Karman vortex emitted from a vortex generator placed in a piping. As a method for detecting the vortex frequency, there is a stress detection method in which a stress detection element is disposed above or inside the vortex generator to detect an alternating lift acting on the vortex generator and the frequency of the Karman vortex is measured. A sensor analog signal from the stress detection element is transferred from a detector to a converter through a sensor lead wire. The analog signal transferred to the converter is converted into a digital signal.

The vortex flowmeter disclosed in Japanese Unexamined Patent Application Publication No. 2002-107192 is also referred to as an integral type because the detector and the converter are integrally formed with each other. On the other hand, the vortex flowmeter includes a remote type vortex flowmeter in which the detector and the converter are separated and connected via a cable. In the remote type vortex flowmeter, in order to take measures against noise in a cable, both the detector and the converter need to perform the aforementioned complicated terminal processing of the cable, so that work man-hours are doubled and particularly, mistakes are likely to occur.

As a structure for taking measures against noise without performing the terminal processing of the cable, for example, a ground structure disclosed in Japanese Unexamined Patent Application Publication No. 2020-107722 is known. In the ground structure, an outer shield of a cable is exposed, and both ends of a clamp portion in contact with the outer shield are screwed to a frame ground. This structure has a problem that in a field device where a cable is drawn from a deep position away from an opening end surface, screwing work is performed at the deep position, so workability is not good.

According to an embodiment of the present invention, in a field device case and a field device, a cable fixing member is fixed to a first inner surface provided at a shallow position with respect to an opening end surface, and an outer shield of a cable is pressed against a second inner surface, which is provided at a position deeper than the first inner surface, by the cable fixing member to take the ground. With this, it is possible to easily take measures against noise in the cable because work can be simply performed at the shallow position with respect to the opening end surface without complicated terminal processing of the cable.

Embodiment

FIG. 1 is a perspective view showing a field device 1 according to an embodiment.

The field device 1 shown in FIG. 1 is a remote type vortex flowmeter and includes a detector 2, a converter 3, and a cable 4. The cable 4 connects between the detector 2 and the converter 3. The detector 2 shown in FIG. 1 includes a piping detection portion 10 and a cable connection vessel 20.

In the following description, an XYZ orthogonal coordinate system may be set and positional relationships between respective members may be described with reference to the XYZ orthogonal coordinate system. It is assumed that an X-axis direction is a direction in which a fluid flows in the piping detection portion 10. It is assumed that a Z-axis direction is a direction orthogonal to the X-axis direction and is a direction in which the cable connection vessel 20 is connected to the piping detection portion 10. It is assumed that a Y-axis direction is a direction orthogonal to the X-axis direction and the Z-axis direction.

The piping detection portion 10 includes a cylindrical piping portion 11 extending in the X-axis direction. The piping portion 11 is provided at both ends thereof with flanges 12 that can be connected to an external piping (not shown). Each of the flanges 12 has a plurality of connection holes 12a formed therein at intervals in a circumferential direction around the central axis of the piping portion 11. A pedestal part 13 is stands upright on the circumferential surface of the piping portion 11 in the Z-axis direction.

A fixing block 15 for fixing a detection portion 14 is screwed to an upper surface of the pedestal part 13 via bolts 15a. The detection portion 14 is formed in a rod shape and is inserted in the Z-axis direction from the upper surface of the pedestal part 13 to the inside of the piping portion 11. The detection portion 14 includes a stress detection element (not shown) inside a rod.

The detection portion 14 detects alternate lifting forces, which acts on a vortex generator of the detection portion 14 disposed inside the piping portion 11, by the stress detection element, measures the frequency of the Karman vortices, and measures the flow speed or the flow rate of a fluid from the frequency. Note that the detection portion 14 may include a sensor that detects not only the flow speed or the flow rate, but also various physical parameters such as temperature, humidity, pressure, vibration, acceleration, and rotational speed.

A holder 16 including a pair of legs straddling the fixing block 15 is screwed to the upper surface of the pedestal part 13 via bolts 16a. The cable connection vessel 20 is screwed to an upper end of the holder 16 via bolts 16b. A sensor lead wire extending from the detection portion 14 (stress detection element) is inserted into the cable connection vessel 20 by passing through the holder 16.

The cable connection vessel 20 includes a tubular metal case 21 (field device case) extending in the Y-axis direction, a first lid 22 fitted to one end of the metal case 21 in the Y-axis direction, and a second lid 23 fitted to the other end of the metal case 21 in the Y-axis direction. The metal case 21 is provided with a lead-in part 24 for drawing the cable 4 at an intermediate position in the Y-axis direction where the first lid 22 and the second lid 23 do not overlap each other.

The converter 3 includes a cable connection vessel 30 and a converter body 40. The cable connection vessel 30 includes a bottomed tubular metal case 31 (field device case) extending in the X-axis direction and a lid 32 fitted to an opening end of the metal case 31 in the X-axis direction. The metal case 31 includes a connection part 33 that can be connected to the converter body 40. The metal case 31 is provided with a lead-in part 34 (see FIG. 2 to be described below) for drawing the cable 4, similarly to the lead-in part 24 described above.

The converter body 40 accommodates a signal converter, which converts an analog signal output from the detection portion 14 (stress detection element) into a digital signal, and the like. The converter body 40 includes a tubular metal case 41 extending in the Y-axis direction, a first lid 42 fitted to one end of the metal case 41 in the Y-axis direction, and a second lid 43 fitted to the other end of the metal case 41 in the Y-axis direction.

Note that the metal case 41 is also provided with a lead-in part 44 having a configuration similar to that of the lead-in part 24 described above, but the lead-in part 44 draws a cable of an external device (not shown). An analog signal output from the detector 2 is transferred to the converter 3 through the cable 4, is converted into a digital signal inside the converter body 40, and then is transferred from the lead-in part 44 to the external device, and the like via a cable (not shown). Note that the sensor output may be temporarily converted into a digital signal by the detector 2 side and output and the converter 3 side may perform arithmetic processing thereon.

Figure 2:
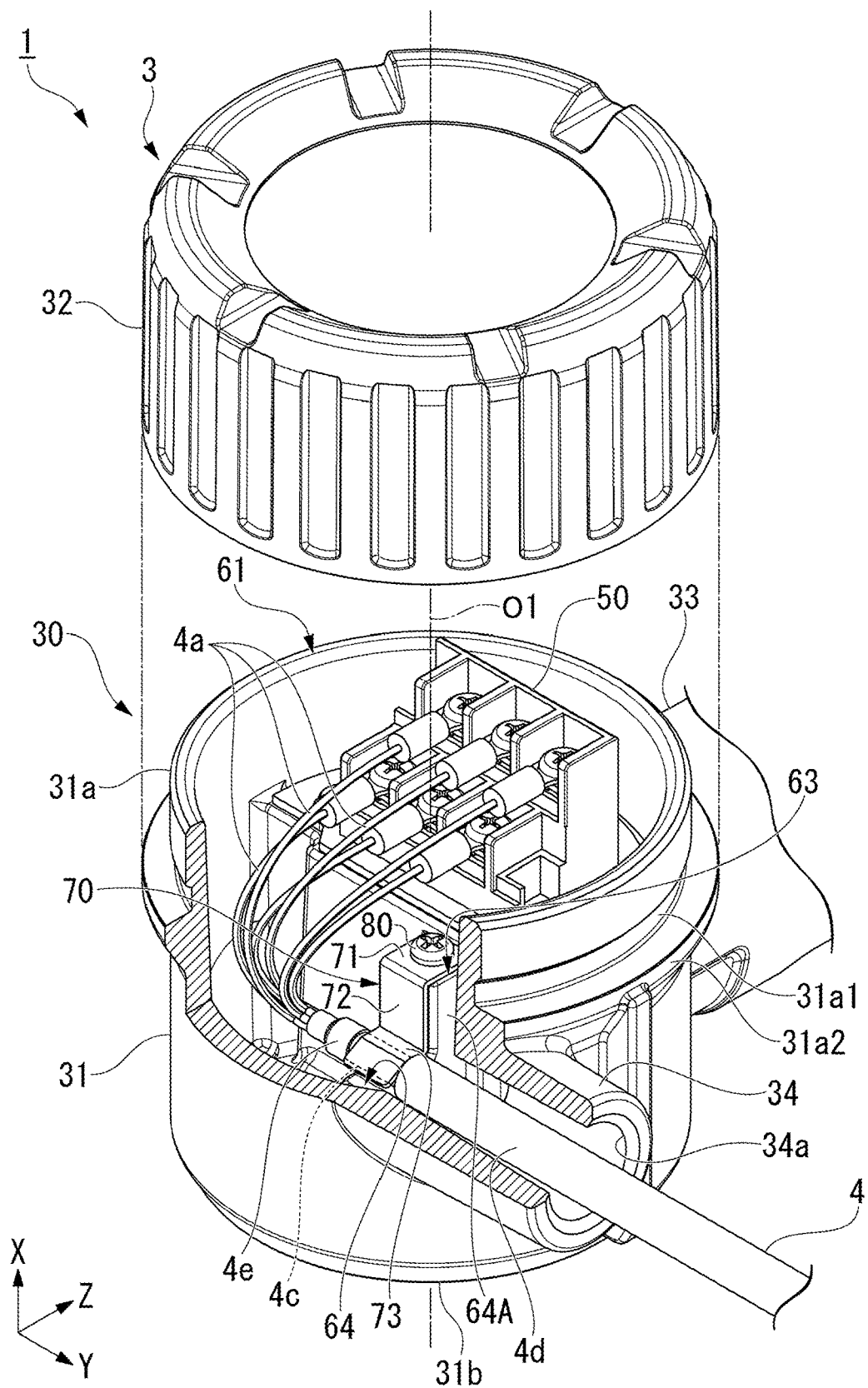
FIG. 2 is a partially cut away perspective view showing a state in which a lid is removed from a cable connection vessel of a converter according to an embodiment.

FIG. 2 is a partially broken perspective view showing a state in which the lid 32 is removed from the cable connection vessel 30 of the converter 3 according to an embodiment.

As shown in FIG. 2, the cable connection vessel 30 of the converter 3 includes the bottomed tubular metal case 31 extending in the X-axis direction and the lid 32 that covers an opening end surface 61 of the metal case 31. Hereinafter, a direction (X-axis direction) orthogonal to the opening end surface 61 of the metal case 31 may be referred to as an axial direction. The axial direction is a direction in which a central axis O1 of the metal case 31 extends.

The metal case 31 includes a circumferential wall 31a and a bottom wall 31b. On the outer circumferential surface of the circumferential wall 31a, a fitting groove 31a1 into which the lid 32 is fitted and a flange 31a2 facing the fitting portion of the lid 32 in the axial direction are formed. Note that the lid 32 may be attached to the outer circumferential surface of the circumferential wall 31a by screws.

The circumferential wall 31a is provided with the lead-in part 34 for drawing the cable 4 inside the metal case 31. The lead-in part 34 is provided to protrude from the circumferential wall 31a on the bottom wall 31b side beyond the flange 31a2 in substantially the tangential direction (Y-axis direction) with respect to an inner circumferential surface of the circumferential wall 31a so as not to interfere with the lid 32 fitted to the circumferential wall 31a. The lead-in part 34 is formed with a lead-in port 34a that communicates with the inside of the metal case 31.

The metal case 31 is provided therein with a terminal box part 50 connected to the cable 4 drawn by the lead-in part 34 and a cable fixing member 70 that fixes the cable 4 to the metal case 31. Hereinafter, the internal structure of the metal case 31 will be described in detail with reference to FIG. 3 to FIG. 5.

Figure 3:
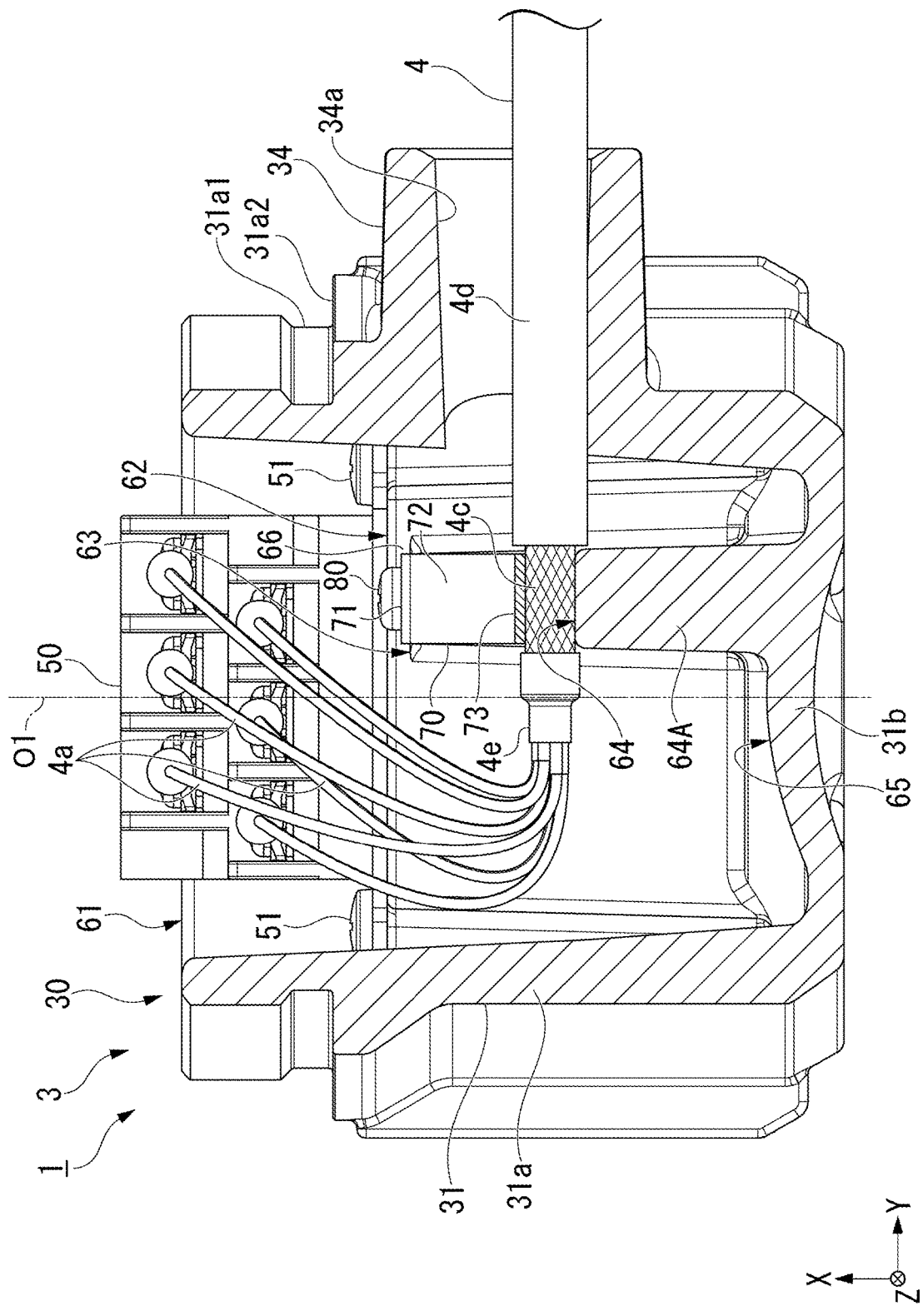
FIG. 3 is a cross-sectional view of a metal case along a lead-in part according to an embodiment.
Figure 4:
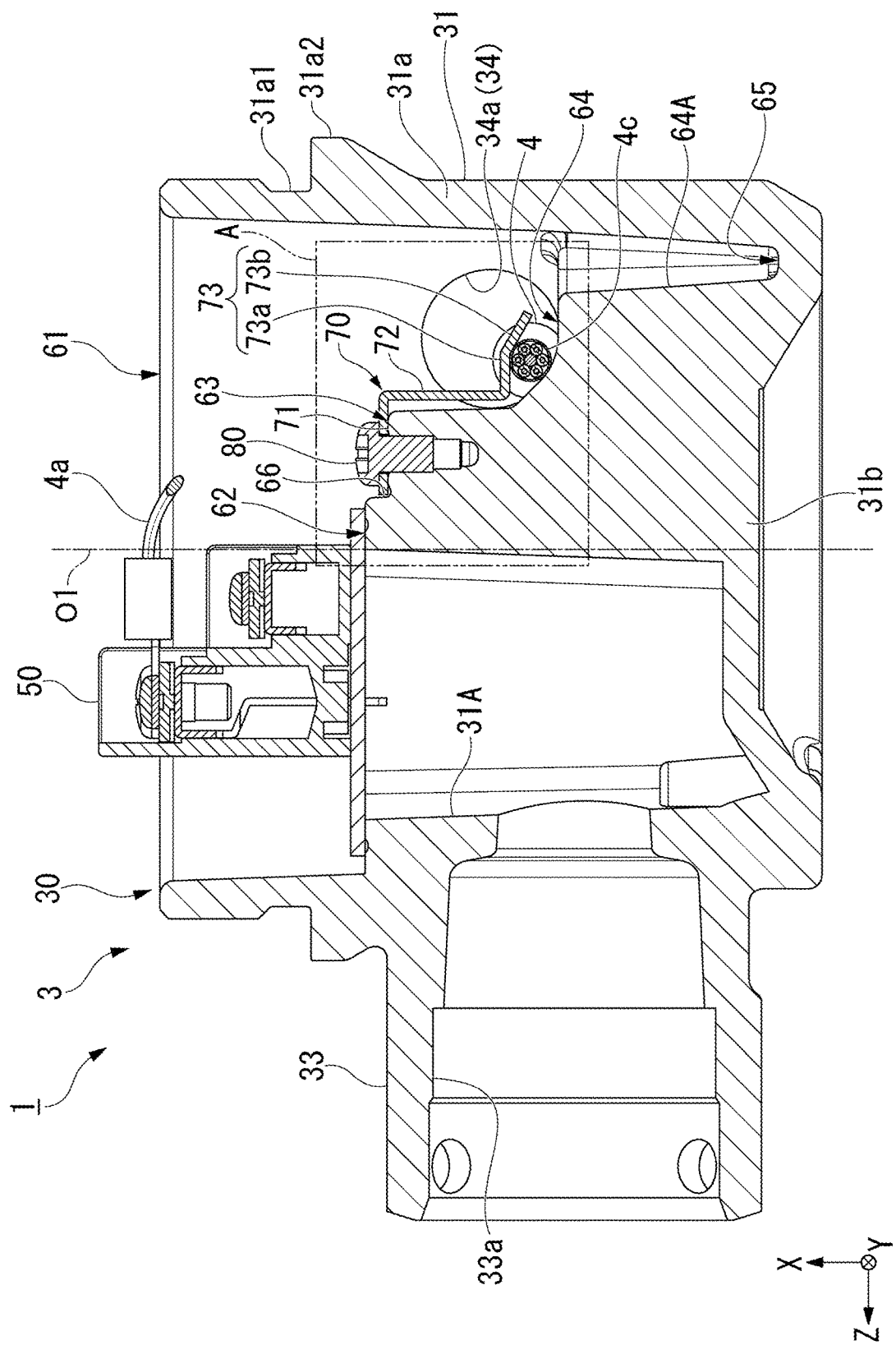
FIG. 4 is a cross-sectional view of the metal case along a cable fixing member according to an embodiment.
Figure 5:
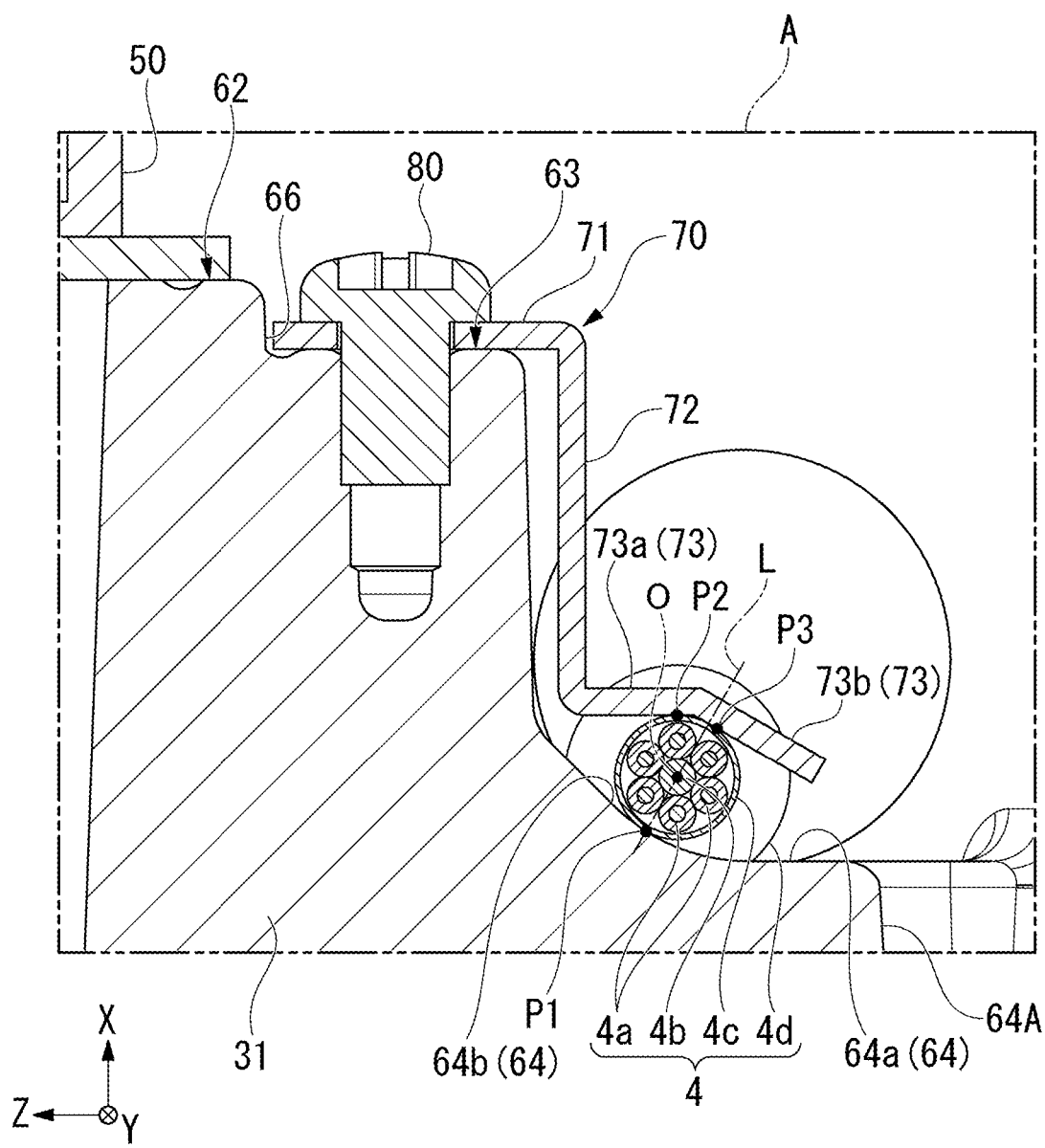
FIG. 5 is an enlarged view of an area A shown in FIG. 4.

FIG. 3 is a cross-sectional view of the metal case 31 along the lead-in part 34 according to an embodiment. FIG. 4 is a cross-sectional view of the metal case 31 along the cable fixing member 70 according to an embodiment. FIG. 5 is an enlarged view of an area A shown in FIG. 4.

As shown in FIG. 4, inside the metal case 31, a terminal box installation surface 62, a first inner surface 63, a second inner surface 64, and a third inner surface 65 are formed in a stepwise manner away from the opening end surface 61 in the axial direction (X-axis direction). The terminal box installation surface 62, the first inner surface 63, the second inner surface 64, and the third inner surface 65 are surfaces that do not overlap each other in the plan view along the central axis O1 and face the opening end surface 61 side inside the metal case 31.

The terminal box installation surface 62 is formed closest to the opening end surface 61. As shown in FIG. 3, the terminal box part 50 is screwed to the terminal box installation surface 62 via a bolt 51. As shown in FIG. 4, a cavity part 31A is formed directly below the terminal box part 50. The cavity part 31A communicates with a connection passage 33a inside the connection part 33. The terminal box part 50 is connected to the converter body 40 side via a cable (not shown) passing through the cavity part 31A and the connection passage 33a.

The first inner surface 63 is provided farther away from the opening end surface 61 than the terminal box installation surface 62. The cable fixing member 70 is screwed to the first inner surface 63 via a bolt 80.

The second inner surface 64 is provided farther away from the opening end surface 61 than the first inner surface 63. The cable 4 drawn by the lead-in part 34 is pressed against the second inner surface 64 by the cable fixing member 70.

The third inner surface 65 is provided farther away from the opening end surface 61 than the second inner surface 64. As shown in FIG. 3, the metal case 31 is provided with a pedestal part 64A that protrudes from the third inner surface 65 toward the opening end surface 61 and is provided with the second inner surface 64 described above. The second inner surface 64 is disposed at substantially the same position as the lead-in port 34a of the lead-in part 34 in the X-axis direction. Note that as shown in FIG. 2, the first inner surface 63 described above is also formed at a distal end of the pedestal part 64A.

As shown in FIG. 5, the cable 4 includes a plurality of internal cables 4a, a central tensile strength body 4b disposed at the center of the plurality of internal cables 4a, an outer shield 4c that surrounds the outer side of the plurality of internal cables 4a, and a sheath 4d that covers the outer side of the outer shield 4c. As shown in FIG. 3, in the cable 4 placed on the second inner surface 64, the sheath 4d corresponding to a front portion of the cable 4 is removed to expose the outer shield 4c.

Furthermore, in the cable 4, the outer shield 4c ahead of the second inner surface 64 is removed, and the plurality of internal cables 4a are separated and connected to the terminal box part 50. The base portions of the plurality of internal cables 4a are bundled by a band cap 4e. The outer shield 4c is, for example, a braided shield in which a metal wire is woven. Note that the outer shield 4c may be obtained by spirally winding a metal tape or by wrapping a metal sheet like a cigarette.

As shown in FIG. 5, the cable fixing member 70 includes a fixing part 71 fixed to the first inner surface 63, a vertical part 72 vertically provided from the fixing part 71 toward the second inner surface 64, and a contact part 73 that is bent from the vertical part 72 to come into contact with the outer shield 4c. The cable fixing member 70 can be formed, for example, by bending a substantially rectangular metal plate into a crank shape. Note that the cable fixing member 70 may be a resin molded component.

The fixing part 71 is fixed to the first inner surface 63 via the bolt 80. The metal case 31 is provided with a rotation preventing part 66 that prevents the cable fixing member 70 from rotating on the first inner surface 63. The rotation preventing part 66 has a convex shape that protrudes from the first inner surface 63 toward the opening end surface 61 and abuts the side surface of the fixing part 71. The rotation preventing part 66 is provided at a portion corresponding to a stepped portion between the terminal box installation surface 62 and the first inner surface 63 described above.

The vertical part 72 is bent at a substantially right angle (angle between the fixing part 71 and the vertical part 72 is substantially 90°) to a side opposite to the opening end surface 61 with respect to the fixing part 71. The vertical part 72 is not in contact with the metal case 31, but may be in contact with the metal case 31.

The contact part 73 has a first contact portion 73a that is bent at a substantially right angle (angle between the vertical part 72 and the contact part 73 is substantially 90°) to a side away from the side surface of the pedestal part 64A with respect to the vertical part 72, and a second contact portion 73b that is bent at a substantially obtuse angle (angle between the second contact portion 73b and the first contact portion 73a is substantially 135°) to a side opposite to the opening end surface 61 with respect to the first contact portion 73a.

As shown in FIG. 5, the contact part 73 includes at least a second contact point P2 and a third contact point P3 that come into contact with the outer shield 4c while interposing a center line L therebetween in the cross-sectional view of the cable 4, the center line L passing through a first contact point P1, where the outer shield 4c and the second inner surface 64 come into contact with each other, and a center point O of the cable 4. Specifically, the first contact portion 73a includes the second contact point P2. Furthermore, the second contact portion 73b includes the third contact point P3. That is, the cable 4 is fixed at three points.

The second inner surface 64 includes a planar portion 64a parallel to the opening end surface 61, and a slope portion 64b that warps from the planar portion 64a toward the opening end surface 61. Note that the slope portion 64b may be either an inclined surface or a curved surface. The slope portion 64b includes the first contact point P1. When the planar portion 64a has the first contact point P1, the cable 4 having a circular shape can escape to either the left or right by the pressing of the cable fixing member 70. On the other hand, if the slope portion 64b includes the first contact point P1, the escape direction of the cable 4 is limited to one direction, so that the cable 4 can be stably pressed. Note that when one of the contact part 73 and the second inner surface 64 is formed on a concave curved surface and the other one is a plane, the left and right escape of the cable 4 can be restrained even in the case of two-point contact.

In the field device 1 configured as above, as shown in FIG. 2, the cable fixing member 70 is fixed to the first inner surface 63 provided at a shallow position with respect to the opening end surface 61 of the metal case 31, the outer shield 4c of the cable 4 is pressed against the second inner surface 64, which is provided at a position deeper than the first inner surface 63, by the cable fixing member 70 to take the ground. With this, it is possible to easily take measures against noise in the cable 4 because the cable fixing member 70 can be attached at the shallow position with respect to the opening end surface 61 without complicated terminal processing of the cable 4.

As described above, the present embodiment described above adopts a configuration in which in the metal case 31 of the field device 1, where the lead-in part 34 for drawing the cable 4 including the outer shield 4c is provided on the tubular circumferential wall 31a, the first inner surface 63, which is provided away from the opening end surface 61 of the metal case 31 in the axial direction orthogonal to the opening end surface 61, and the second inner surface 64, which is provided farther away from the opening end surface 61 than the first inner surface 63 in the axial direction, are formed, and the metal case 31 includes the cable fixing member 70 that is fixed to the first inner surface 63 and allows the outer shield 4c of the cable 4 drawn by the lead-in part 34 to be in contact with the second inner surface 64. Consequently, in the field device 1 where the cable 4 is drawn from the portion of the circumferential wall 31a away from the opening end surface 61, it is possible to easily take measures against noise in the cable 4 without complicated terminal processing.

Furthermore, in the present embodiment, as shown in FIG. 5, the metal case 31 is provided with the rotation preventing part 66 that prevents the cable fixing member 70 from rotating on the first inner surface 63. According to such a configuration, the rotation of the cable fixing member 70 around the bolt 80 can be restrained. Therefore, the cable fixing member 70 can stably press the cable 4.

Furthermore, in the present embodiment, the rotation preventing part 66 has a convex shape that protrudes from the first inner surface 63 toward the opening end surface 61 and abuts the side surface of the cable fixing member 70. According to such a configuration, the side surface of the cable fixing member 70 abuts the convex shape of the rotation preventing part 66, so that the rotation of the cable fixing member 70 can be restrained by a simple structure.

Furthermore, in the present embodiment, the cable fixing member 70 includes at least the second contact point P2 and the third contact point P3 that conic into contact with the outer shield 4c while interposing the center line L therebetween in the cross-sectional view of the cable 4, the center line L passing through the first contact point P1, where the outer shield 4c and the second inner surface 64 come into contact with each other, and the center point O of the cable 4. According to such a configuration, the cable 4 can be stably fixed at three points. Note that if the cable 4 can be fixed at least three points, the cable 4 may be fixed at four points or more.

Furthermore, in the present embodiment, as shown in FIG. 3, the metal case 31 is provided with the third inner surface 65, which is provided farther away from the opening end surface 61 than the second inner surface 64, and the pedestal part 64A, which protrudes from the third inner surface 65 toward the opening end surface 61 and is provided with the second inner surface 64, in the axial direction. According to such a configuration, the pedestal part 64A is erected from the third inner surface 65 and the second inner surface 64 is formed to have substantially the same depth as the lead-in port 34a of the cable 4, so that the outer shield 4c of the cable 4 can be pressed against the second inner surface 64 to take the ground without applying forcible bending and the like to the cable 4.

Figure 6:
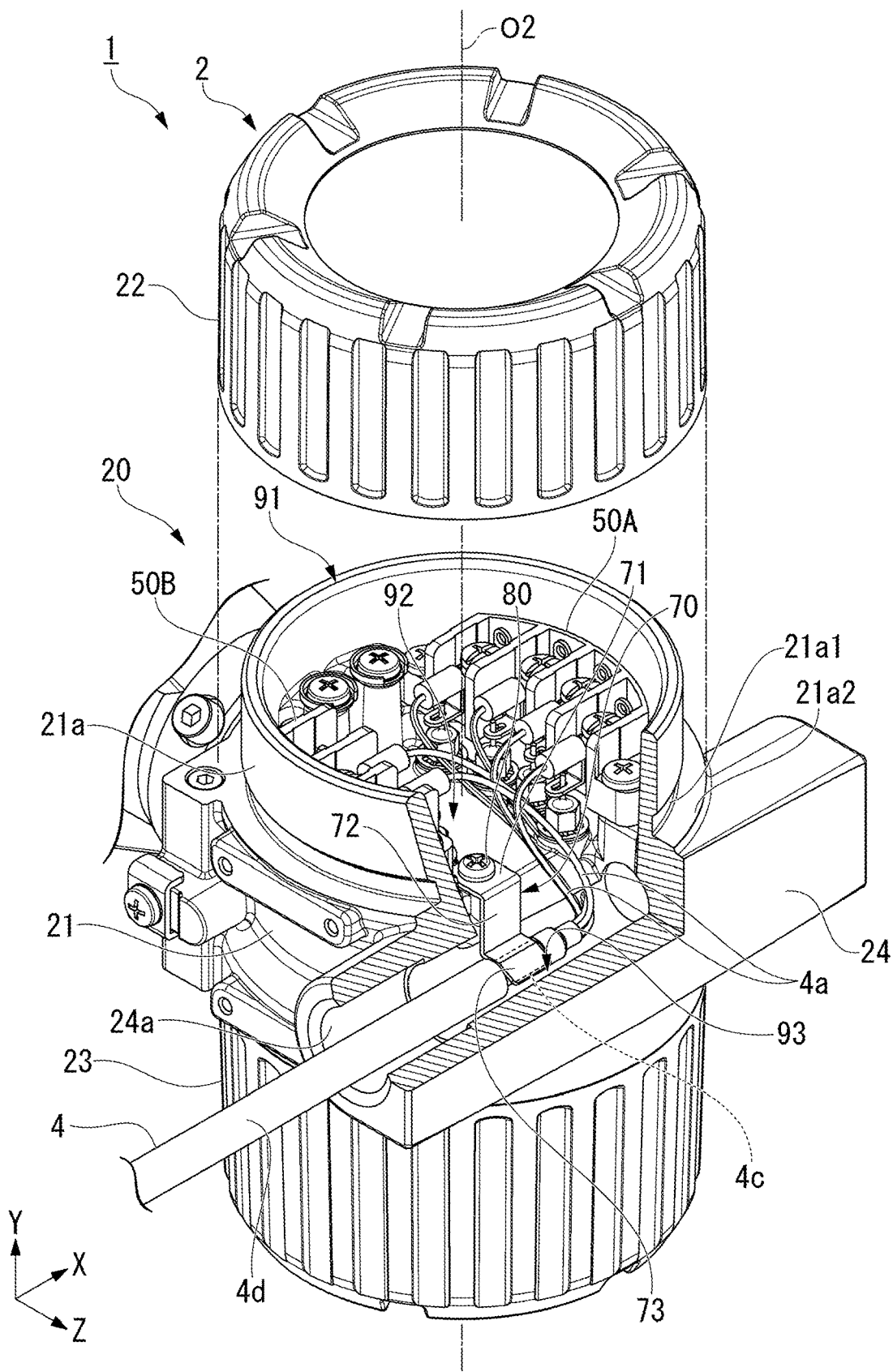
FIG. 6 is a partially broken perspective view showing a state in which a first lid is removed from a cable connection vessel of a detector according to an embodiment.

Note that as shown in FIG. 6, the metal case 21 of the cable connection vessel 20 of the detector 2 also has a structure substantially similar to that of the metal case 31 described above.

FIG. 6 is a partially broken perspective view showing a state in which the first lid 22 is removed from the cable connection vessel 20 of the detector 2 according to an embodiment.

As shown in FIG. 6, the cable connection vessel 20 of the detector 2 includes the tubular metal case 21 extending in the Y-axis direction. The metal case 21 is formed on the outer circumferential wall 21a thereof with a fitting groove 21a1 into which the first lid 22 is fitted and a flange 21a2 facing the fitting portion of the first lid 22 in the Y-axis direction.

Hereinafter, a direction (Y-axis direction) orthogonal to an opening end surface 91 of the metal case 21 may be referred to as an axial direction. The axial direction is a direction in which a central axis O2 of the metal case 21 extends. Inside the metal case 21, a first inner surface 92 and a second inner surface 93 are formed away from the opening end surface 91 in the axial direction (Y-axis direction). The first inner surface 92 and the second inner surface 93 are surfaces that do not overlap each other in the plan view along the central axis O2 and face the opening end surface 91 side inside the metal case 21.

A terminal box part 50A and a terminal box part 50B are installed on the first inner surface 92, and the fixing part 71 of the cable fixing member 70 is screwed via the bolt 80. The second inner surface 93 is provided farther away from the opening end surface 91 than the first inner surface 92. The second inner surface 93 is an inner wall surface of a lead-in port 24a that draws the cable 4 inside the metal case 21. Note that the terminal box part 50A and the terminal box part 50B may be fixed to a surface closer to the opening end surface 91 than the cable fixing member 70 and may include the rotation preventing part 66 described above. Furthermore, the terminal box part 50A and the terminal box part SOB themselves may prevent the cable fixing member 70 from rotating.

Even in such a configuration, the cable fixing member 70 may be fixed to the first inner surface 92 provided at a shallow position with respect to the opening end surface 91 of the metal case 21, and the outer shield 4c of the cable 4 may be pressed against the second inner surface 93, which is provided at a position deeper than the first inner surface 92, by the cable fixing member 70 to take the ground. With this, it is possible to easily take measures against noise in the cable 4 because the cable fixing member 70 can be attached at the shallow position with respect to the opening end surface 91 without complicated terminal processing of the cable 4.

Although the preferred embodiment of the present invention has been described with reference to the drawings, the present invention is not limited to the above embodiment. The all shapes and combinations of respective constituent members shown in the embodiment described above are examples, and can be variously changed on the basis of design requirements and the like without departing from the gist of the present invention.

For example, the above embodiment has described the configuration in which the detector 2 that outputs a detection result and the converter 3 connected to the detector 2 via the cable 4 are provided, and both the detector 2 and the converter 3 include metal field device cases (metal cases 21 and 31) including the aforementioned cable fixing member 70, respectively. However, any one of the detector 2 and the converter 3 may be configured to include the metal field device case including the aforementioned cable fixing member 70.

For example, in the above embodiment, the cable 4 is circular in the cross-sectional view, but may be a quadrangle, other polygons, an ellipse, or other variants.

(Supplementary Note)

(1) A field device case according to an aspect of the invention is a metal field device case where a lead-in part for drawing a cable including an outer shield is provided on a tubular circumferential wall, and the field device case may include: a first inner surface which is formed away from an opening end surface of the field device case in an axial direction orthogonal to the opening end surface; a second inner surface which is formed farther away from the opening end surface than the first inner surface in the axial direction; and a cable fixing member which is fixed to the first inner surface and allows the outer shield of the cable drawn by the lead-in part to be in contact with the second inner surface.

(2) In the field device case disclosed in the above (1), a rotation preventing part may be formed to prevent the cable fixing member from rotating on the first inner surface.

(3) In the field device case disclosed in the above (2), the rotation preventing part may have a convex shape that protrudes from the first inner surface toward the opening end surface and abuts a side surface of the cable fixing member.

(4) In the field device case disclosed in any one of the above (1) to (3), the cable fixing member may include at least a second contact point and a third contact point that come into contact with the outer shield while a center line is interposed between the second contact point and the third contact point in the cross-sectional view of the cable, the center line passing through a first contact point, where the outer shield and the second inner surface come into contact with each other, and a center point of the cable.

(5) The field device case disclosed in the above (4) may further include: a third inner surface which is formed farther away from the opening end surface than the second inner surface in the axial direction; and a pedestal part which protrudes from the third inner surface toward the opening end surface and is provided with the second inner surface.

(6) The field device case disclosed in the above (5) may further include: a metal case which is bottomed tubular and extending in the axial direction; and a lid which is fitted to the metal case.

(7) In the field device case disclosed in the above (6), the metal case may include a circumferential wall and a bottom wall, and a fitting groove into which the lid is fitted and a flange facing a fitting portion of the lid in the axial direction may be formed on an outer circumferential surface of the circumferential wall.

(8) In the field device case disclosed in the above (7), the circumferential wall may be provided with the lead-in part, and the lead-in part may be provided to protrude from the circumferential wall on a side of the bottom wall beyond the flange in a tangential direction with respect to an inner circumferential surface of the circumferential wall so as not to interfere with the lid fitted to the circumferential wall.

(9) The field device case disclosed in the above (6) may further include: a terminal box part which is provided in the metal case and is connected to the cable drawn by the lead-in part.

(10) The field device case disclosed in the above (9) may further include: a terminal box installation surface on which the terminal box part is installed, and the terminal box installation surface, the first inner surface, the second inner surface, and the third inner surface may be surfaces that do not overlap each other in a plan view along a central axis of the metal case and face the opening end surface inside the metal case.

(11) In the field device case disclosed in the above (5), the first inner surface may be formed at a distal end of the pedestal part, and the second inner surface may be disposed at a same position as a lead-in port of the lead-in part in the axial direction.

(12) In the field device case disclosed in the above (5), the cable fixing member may include: a fixing part which is fixed to the first inner surface; a vertical part which is vertically provided from the fixing part toward the second inner surface; and a contact part which is bent from the vertical part to come into contact with the outer shield.

(13) In the field device case disclosed in the above (12), the fixing part may be fixed to the first inner surface via a bolt.

(14) In the field device case disclosed in the above (12), the vertical part may be bent at a right angle to a side opposite to the opening end surface with respect to the fixing part.

(15) In the field device case disclosed in the above (12), the contact part may include: a first contact portion which is bent at a right angle to a side away from a side surface of the pedestal part with respect to the vertical part; and a second contact portion which is bent at a obtuse angle to a side opposite to the opening end surface with respect to the first contact portion.

(16) In the field device case disclosed in the above (15), the first contact portion may include the second contact point; and the second contact portion may include the third contact point.

(17) A field device according to an aspect of the invention may include: a detector configured to output a detection result; and a converter connected to the detector via a cable, and at least one of the detector or the converter may include the field device case disclosed in any one of the above (1) to (16).

(18) In the field device disclosed in the above (17), the detector may include: a piping portion in which fluid flows; and a detection portion configured to measure a flow speed or a flow rate of the fluid.

(19) In the field device disclosed in the above (18), the detection portion may be disposed inside the piping portion, and a stress detection element that measures the flow speed or the flow rate of the fluid may be provided inside the detection portion.

(20) In the field device disclosed in the above (19), the stress detection element may detect alternate lifting forces acting on a vortex generator of the detection portion, may measure a frequency of Karman vortices, and may measure the flow speed or the flow rate of the fluid from the frequency.

According to an aspect of the present invention, it is possible to easily take measures against noise in a cable without complicated terminal processing in a field device case and a field device where the cable is drawn from a circumferential wall portion away from an opening end surface.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field device case that is a metal field device case where a lead-in part for drawing a cable including an outer shield is provided on a tubular circumferential wall, the field device case comprising:
   a first inner surface which is formed away from an opening end surface of the field device case in an axial direction orthogonal to the opening end surface;
   a second inner surface which is formed farther away from the opening end surface than the first inner surface in the axial direction; and
   a cable fixing member which is fixed to the first inner surface and allows the outer shield of the cable drawn by the lead-in part to be in contact with the second inner surface,
   wherein the cable fixing member comprises at least a second contact point and a third contact point that come into contact with the outer shield while a center line is interposed between the second contact point and the third contact point in the cross-sectional view of the cable, the center line passing through a first contact point, where the outer shield and the second inner surface come into contact with each other, and a center point of the cable.

2. The field device case according to claim 1,
   wherein a rotation preventing part is formed to prevent the cable fixing member from rotating on the first inner surface.

3. The field device case according to claim 2,
   wherein the rotation preventing part has a convex shape that protrudes from the first inner surface toward the opening end surface and abuts a side surface of the cable fixing member.

4. The field device case according to claim 1, further comprising:
   a third inner surface which is formed farther away from the opening end surface than the second inner surface in the axial direction; and
   a pedestal part which protrudes from the third inner surface toward the opening end surface and is provided with the second inner surface.

5. The field device case according to claim 4, further comprising:
   a metal case which is bottomed tubular and extending in the axial direction; and
   a lid which is fitted to the metal case.

6. The field device case according to claim 5,
   wherein the metal case comprises a circumferential wall and a bottom wall, and
   wherein a fitting groove into which the lid is fitted and a flange facing a fitting portion of the lid in the axial direction are formed on an outer circumferential surface of the circumferential wall.

7. The field device case according to claim 6,
   wherein the circumferential wall is provided with the lead-in part, and
   wherein the lead-in part is provided to protrude from the circumferential wall on a side of the bottom wall beyond the flange in a tangential direction with respect to an inner circumferential surface of the circumferential wall so as not to interfere with the lid fitted to the circumferential wall.

8. The field device case according to claim 5, further comprising:
   a terminal box part which is provided in the metal case and is connected to the cable drawn by the lead-in part.

9. The field device case according to claim 8, further comprising:
   a terminal box installation surface on which the terminal box part is installed,
   wherein the terminal box installation surface, the first inner surface, the second inner surface, and the third inner surface are surfaces that do not overlap each other in a plan view along a central axis of the metal case and face the opening end surface inside the metal case.

10. The field device case according to claim 4,
    wherein the first inner surface is formed at a distal end of the pedestal part, and
    wherein the second inner surface is disposed at a same position as a lead-in port of the lead-in part in the axial direction.

11. The field device case according to claim 4,
    wherein the cable fixing member comprises:
    a fixing part which is fixed to the first inner surface;
    a vertical part which is vertically provided from the fixing part toward the second inner surface; and
    a contact part which is bent from the vertical part to come into contact with the outer shield.

12. The field device case according to claim 11,
    wherein the fixing part is fixed to the first inner surface via a bolt.

13. The field device case according to claim 11,
    wherein the vertical part is bent at a right angle to a side opposite to the opening end surface with respect to the fixing part.

14. The field device case according to claim 11,
    wherein the contact part comprises:
    a first contact portion which is bent at a right angle to a side away from a side surface of the pedestal part with respect to the vertical part; and
    a second contact portion which is bent at a obtuse angle to a side opposite to the opening end surface with respect to the first contact portion.

15. The field device case according to claim 14,
    wherein the first contact portion comprises the second contact point; and
    wherein the second contact portion comprises the third contact point.

16. A field device comprising:
a detector configured to output a detection result; and
a converter connected to the detector via a cable,
wherein at least one of the detector or the converter comprises the field device case according to claim 1.

17. The field device according to claim 16,
wherein the detector comprises:
 a piping portion in which fluid flows; and
 a detection portion configured to measure a flow speed or a flow rate of the fluid.

18. The field device according to claim 17,
wherein the detection portion is disposed inside the piping portion, and
wherein a stress detection element that measures the flow speed or the flow rate of the fluid is provided inside the detection portion.

19. The field device according to claim 18,
wherein the stress detection element detects alternate lifting forces acting on a vortex generator of the detection portion, measures a frequency of Karman vortices, and measures the flow speed or the flow rate of the fluid from the frequency.

* * * * *